US009122822B2

(12) United States Patent
Tsunoda et al.

(10) Patent No.: US 9,122,822 B2
(45) Date of Patent: Sep. 1, 2015

(54) THREE-DIMENSIONAL FLUID SIMULATION METHOD

(75) Inventors: Masaya Tsunoda, Kobe (JP); Arjun Yadav, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 503 days.

(21) Appl. No.: 13/460,394

(22) Filed: Apr. 30, 2012

(65) Prior Publication Data

US 2012/0296616 A1 Nov. 22, 2012

(30) Foreign Application Priority Data

May 16, 2011 (JP) .................................. 2011-109673
Mar. 22, 2012 (JP) .................................. 2012-65942

(51) Int. Cl.
*G06F 17/50* (2006.01)
*G06G 7/57* (2006.01)
(52) U.S. Cl.
CPC .............. *G06F 17/5018* (2013.01); *G06G 7/57* (2013.01); *G06F 17/5009* (2013.01); *G06F 2217/16* (2013.01)
(58) Field of Classification Search
CPC ............ G06F 17/5018; G06F 17/5009; G06F 2217/16; G06F 2217/34; G06G 7/57
USPC ......................................................... 703/6, 9
See application file for complete search history.

(56) References Cited

U.S. PATENT DOCUMENTS

2011/0256944 A1* 10/2011 Sato .............................. 473/165

FOREIGN PATENT DOCUMENTS

EP 1585040 A1 10/2005

OTHER PUBLICATIONS

Freitas, C.J. et al., "Simulation of Fluid-Structure Interaction Using Patched-Overset Grids", 1999, Journal of Fluids and Structures, 13, Academic Press.*
Tai, Chang-Hsien et al., "Effects of Golf Ball Dimple Configuration on Aerodynamics, Trajectory, and Acoustics", 2007.*
Babu et al., "On the Direct Solution of Poisson's Equation on a Non-uniform Grid," Journal of Computational Physics, vol. 104, 1993, pp. 93-98, XP024748763.
Extended European Search Report dated Aug. 17, 2012 for European Application No. 12167508.6.

(Continued)

*Primary Examiner* — Kamini S Shah
*Assistant Examiner* — Cedric D Johnson
(74) *Attorney, Agent, or Firm* — Birch, Stewart, Kolasch & Birch, LLP

(57) ABSTRACT

A three-dimensional fluid simulation method is disclosed wherein: a first mesh of a flow domain non-uniformly split with respect to each of three degrees of freedom is defined; a second mesh uniformly sprit with respect to only one of the three degrees of freedom but non-uniformly with respect to other two degrees is defined; an object model is set in the first mesh and a motion equation is formed and calculated to obtain fluid velocity; based on the fluid velocity, flow imbalance is computed for each cell; based on the flow imbalance, fluid pressure correction equation is formed; the flow imbalance is mapped onto the second mesh and the fluid pressure correction is computed; the fluid pressure correction is mapped onto the first mesh; and until the flow imbalance and motion equations are converged the computation is repeated.

6 Claims, 14 Drawing Sheets
(1 of 14 Drawing Sheet(s) Filed in Color)

(56) References Cited

OTHER PUBLICATIONS

Farnell, "Solution of Poisson Equations on a Nonuniform Grid," Journal of Computational Physics, vol. 35, 1980, pp. 408-425, XP024749584.

Smith et al., "Numerical investigation of the flow over a golf ball in the subcritical and supercritical regimes," International Journal of Heat and Fluid Flow, vol. 31, 2010, pp. 262-273, XP055029979.

Swarztrauber et al., "Vector and parallel methods for the direct solution of Poisson's equation," Journal of Computational and Applied Mathematics, vol. 27, 1989, pp. 241-263, XP055010101.

* cited by examiner source term of first mesh superimpose of source terms of first and second meshes source term of first mesh superimpose of source terms of first and second meshes 0m=position of ball's center

THREE-DIMENSIONAL FLUID SIMULATION METHOD

BACKGROUND OF THE INVENTION

The present invention relates to a computerized method for three-dimensional fluid simulation to analyze fluid flows around an object.

Heretofore, various fluid simulations in which the state of fluid (velocity, pressure, etc.) flowing around an object are analyzed by the use of a computer were proposed and utilized to develop the geometry of an object, for example, an arrangement of dimples of a golf ball in order to decrease the air resistance (drag) and improve the flight performance.

As well known, in a computerized fluid simulation, a flow domain or a three-dimensional space in which the fluid flows is split into subdomains (often called elements or cells) to generate a grid or mesh. In a domain near the object, the fluid flow is expected to become complex. But in a domain relatively away from the object, the fluid flow is expected to be simple. Therefore, in a grid generation, it is desirable that the domain far from the object is split into a coarse grid or mesh (namely, the grating density is lower) from the aspect of the computational efficiency although the domain near the object has to be split into a fine grid or mesh (namely, the grating density is higher) in order to increase the spacial resolution and thereby to enable detailed analyses of the fluid flow.

In order to achieve such variable spacial resolution, if the flow domain or the above-mentioned 3-D space is non-uniformly split with respect to each of three degrees of freedom (triaxial) of three dimensions, then direct methods such as FFT plus block cyclic reduction method can not be used in the computation, and it becomes necessary to use iteration methods such as Algebraic Multigrid Method (AMG method) and Full Multigrid Method (FMG method). As a result, there is a problem such that the computational time is significantly increased.

On the other hand, if the flow domain is uniformly split with respect to each of three degrees of freedom of three dimensions, into a uniform structured grid, then it is necessitated that the number of the subdomains (cells) becomes enormous in order to achieve sufficient analytical accuracy. In this case too, there is a problem such that the computational time is unfavorably increased.

SUMMARY OF THE INVENTION

Therefore, with the view to the above-mentioned problems, the present invention was studied out and its objective is to provide a three-dimensional fluid simulation method by which an increase in the computational time and cost can be inhibited even though the three-dimensional flow domain is non-uniformly split into a mesh such that a domain in which detailed analyses are necessary is finely split and a domain in which detailed analyses are not necessary is coarsely split.

According to the present invention, a three-dimensional fluid simulation method for analyzing a flow of fluid around an object by the use of a computer comprises:

a process (a) in which a first mesh of a three-dimensional space where the fluid flows is defined in the computer, wherein the first mesh is defined by non-uniformly splitting the space with respect to each of three degrees of freedom of the space, a process (b) in which a second mesh of the space is defined in the computer, wherein the second mesh is defined by non-uniformly splitting the space with respect to two of the three degrees of freedom and uniformly splitting the space with respect to the remaining one of the three degrees of freedom, a process (c) in which an object model of the object is defined in the computer, wherein the object model is defined by splitting the object into a finite number of cells, and the object model is disposed in the first mesh, a process (d) in which boundary conditions are given and a motion equation relating to the fluid around the object model is defined, and the velocity of the fluid is computed from the motion equation, a process (e) in which a flow imbalance is computed for each cell based on the velocity of the fluid obtained in the process (d), a process (f) in which a pressure correction equation relating to the fluid is defined based on the flow imbalance, this corrects the pressure such that after this correction there exist no flow imbalance in calculation domain, a process (g) in which the obtained flow imbalance is mapped onto the second mesh, and the pressure correction of the fluid is computed, and a process (h) in which the pressure correction obtained in the process (g) is mapped onto the first mesh, and the processes (d)-(h) are repeated until the flow imbalance obtained in the process (e) is converged such that velocity is a solution to motion equations.

The repetition of processes (d)-(h) becomes necessary from the fact that once the pressure is corrected, even though the flow imbalance is completely removed, new corrected velocity does not confirm to motion equation in (d). By repetition of (d)-(h), a solution set of pressure and velocity is obtained such that both motion equation and mass balance equation (called continuity equation) are satisfied.

In a fluid simulation in which a Navier-Stokes equation of an incompressible fluid is to be solved by a pressure-based splitting method, it is necessary that motion equations and pressure correction equations are calculated.

In the calculation of the motion equations, the computational time is substantially not affected by the fact whether the grid splitting is uniform or non-uniform.

However, in the case of the pressure correction equation, as the grid splitting is non-uniform, the pressure equation have to be solved by AMG method or FMG method. Therefore, the computational time is increased. Thus, in order to calculate the pressure correction equation, it is necessary to reduce the number of the dimensions by the use of fast Fourier transformation (FFT), and then to solve the equations by the use of a block cyclic reduction method or the like.

According to the present invention, by the use of a first mesh which is non-uniformly split with respect to each of three degrees of freedom, motion equations on the fluid are defined, and then velocity of the fluid is computed therefrom.

The velocity of the fluid obtained through the calculation of the motion equations is used to calculate mass imbalance on first mesh.

To remove this mass imbalance pressure correction is sought. The mass imbalance is mapped onto a second mesh, which acts as source terms for pressure correction equation on second mesh.

Here, the second mesh is split uniformly with respect to one of the three degrees of freedom of the first mesh, but non-uniformly with respect to other two of the three degrees of freedom.

On the second mesh, pressure correction equations are solved by use of direct method that uses FFT (Fast Fourier Transform) and Block Cyclic Reduction Method. The pressure correction obtained here is mapped to first mesh.

As explained above, the motion equations are calculated on the first mesh non-uniformly split with respect to each of the three degrees of freedom, and the pressure correction equations are calculated on the second mesh uniformly split with respect to one of the three degrees of freedom. And these calculations are repeated until a flow imbalance and motion equations converge.

Such algorithm is employed in the fluid simulation method according to the present invention. As a result, the total computational time and cost for fluid simulations can be reduced.

BRIEF DESCRIPTION OF THE DRAWINGS

The patent or application file contains at least one color drawing. Copies of this patent or patent application publication with color drawing will be provided by the USPTO upon request and payment of the necessary fee.

DESCRIPTION OF THE PREFERRED EMBODIMENTS

Embodiments of the present invention will now be described in detail in conjunction with accompanying drawings.

The present invention is a three-dimensional fluid simulation method to give an analysis of fluid flow around an object by the use of a computer.

As to the fluid, an incompressible fluid, namely, a fluid whose density variation due to changes in the pressure and/or temperature is negligible is used.

In most of phenomena concerning fluid flows such as air flows in the environment, the fluid can be assumed as being incompressible. Therefore, equations representing the flow domain can be simplified on the premise of the incompressibility. In general, when a simulation is made under conditions of Mach numbers smaller than 0.3, the air can be regarded as incompressible.

As to the object, it is possible to deal with various objects as far as the outer surface shape is definite.

In this embodiment, the fluid is air, and the object is a golf ball, and a simulation to analyze the air flow around the golf ball flying in the air is made.

Figure 1:
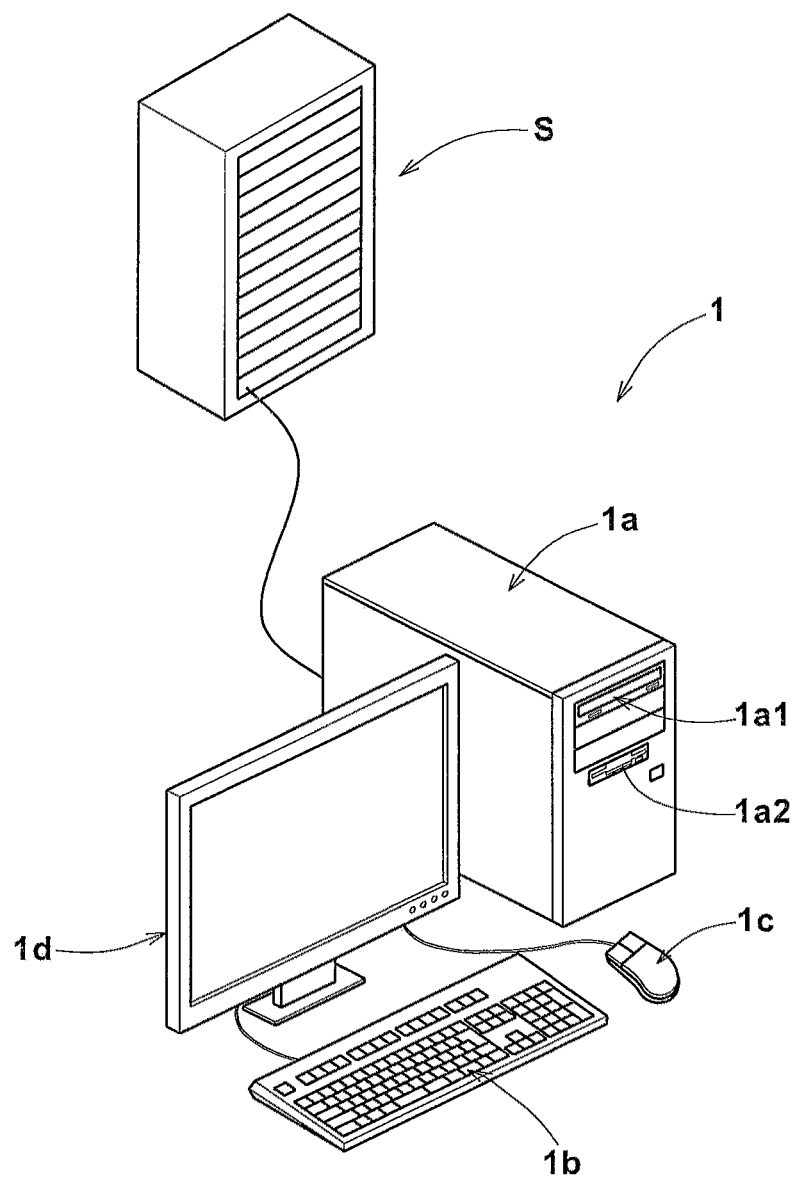
FIG. 1 shows a computer system for carrying out a simulation method according to the present invention.

The simulation in this embodiment is carried out by the use of a computer system 1 as shown in FIG. 1.

The computer system 1 comprises a compute server S in which large-scale computations are possible, and a client computer 1a connected to the compute server S and making the compute server S to carry out peculiar calculations.

The client computer 1a comprises CPU, ROM, work memory and mass-storage device such as magnetic disk. A keyboard 1b, a mouse 1c and a display 1d are connected thereto. Further, the client computer 1a is provided with disk drive devices 1a1 and 1a2 for an optical disk such as CD-ROM and a flexible disk.

In the above-mentioned mass-storage device, the aftermentioned software program for carrying out the simulation method according to the present invention is stored.

Figure 2:
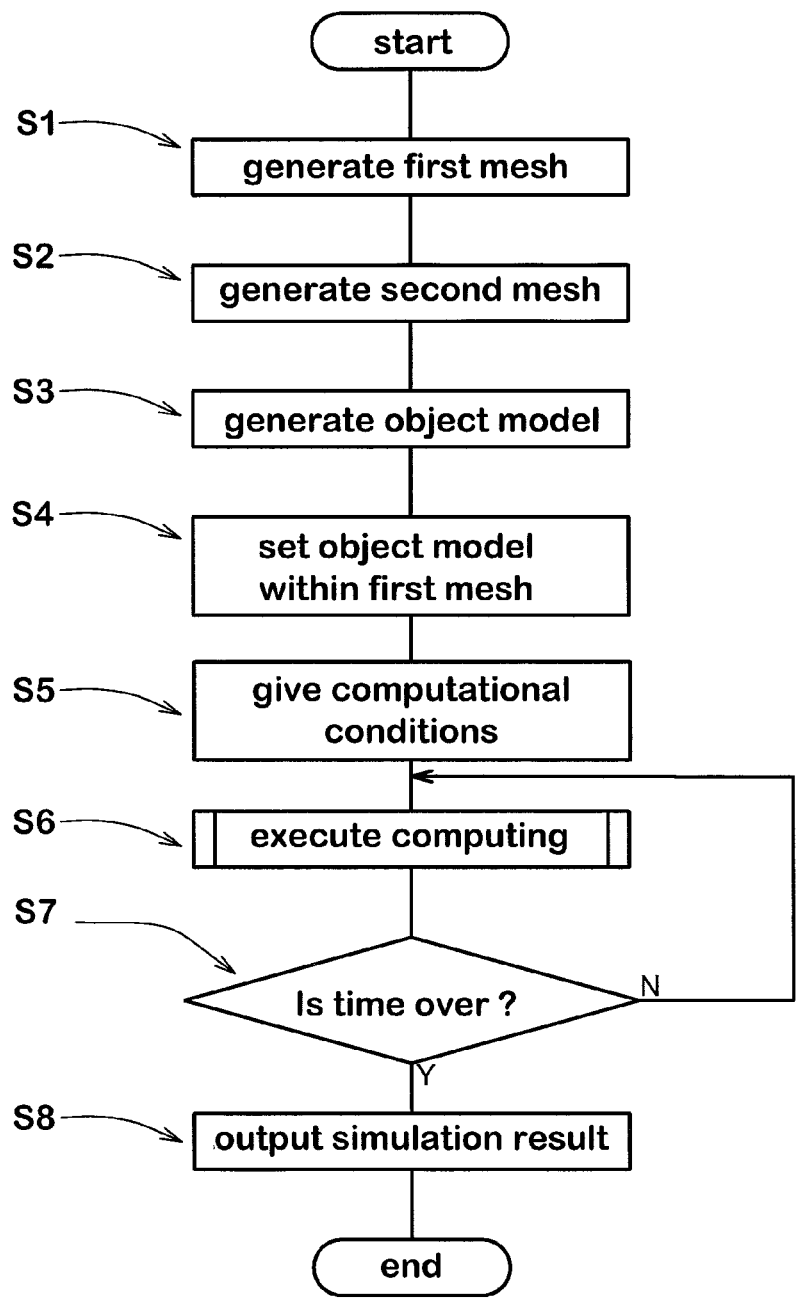
FIG. 2 shows an overall flow chart of the simulation method according to the present invention.

FIG. 2 shows a flow chart of the simulation method in this embodiment. The processes thereof will be explained hereunder.

[Process (a) (S1 in FIG. 2)]

In a process (a), a first mesh is generated in the computer system 1.

Figure 3:
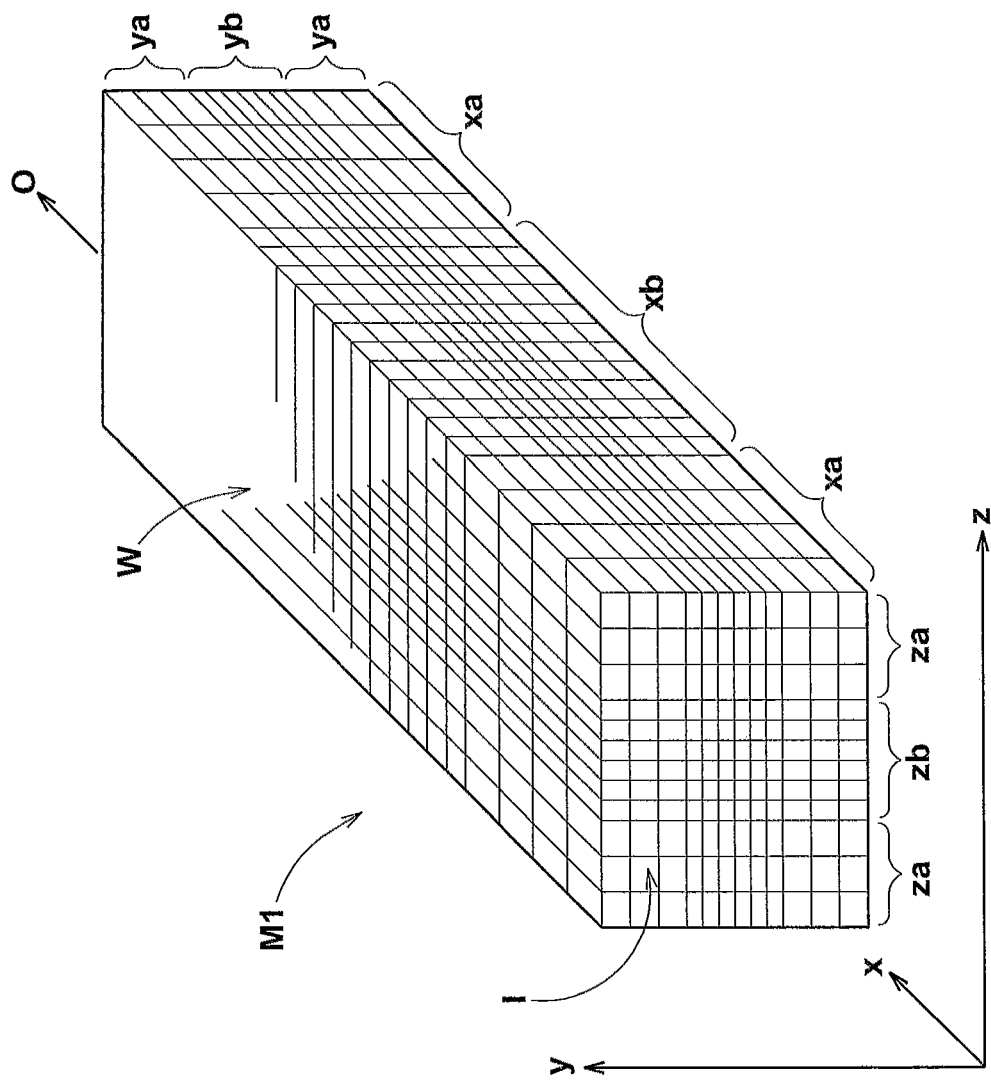
FIG. 3 is a diagrammatic perspective view of a first mesh.

The first mesh M1 is schematically shown in FIG. 3.

The first mesh M1 determines the size of the flow domain namely the 3-D space where the fluid flows, and positions at which the physical quantity is computed. Consequently, the first mesh M1 is defined as a finite space which is split into a large number of subdomains (cells).

For example, the physical quantity of the fluid is that at each grid point of the mesh. Therefore, entered in the computer system 1 are parameters which can specify the flow domain and the grid splitting (in this embodiment, the x-, y- and Z-dimensions of the first mesh M1 and the coordinate values of the respective grid points). Incidentally, the dimensions of the first mesh M1 can be set arbitrarily depending on the object to be analyzed, the purpose of the analysis and the like.

The first mesh M1 in this embodiment is defined as a rectangular parallelepiped in a Cartesian coordinate system.

It is however, not to be limited to such coordinate system.

It is possible to adopt a cylindrical coordinate system, a polar coordinate system or the like as far as the three-dimensional space can be defined.

The first mesh M1 is non-uniformly split with respect to each of the three degrees of freedom of the three-dimensional space (namely, in this example, x-axis, y-axis and z-axis).

In the x-axis direction, the first mesh M1 in this embodiment is split such that a central domain xb is finely split so that the grating density becomes high, and a domain xa on each side thereof is coarsely split so that the grating density becomes lower than that in the central domain xb.

Similarly, in the y-axis direction, the first mesh M1 has a finely-split central domain yb and a coarsely-split domain ya on each side thereof. And in the z-axis direction, the first mesh M1 has a finely-split central domain zb and a coarsely-split domain za on each side thereof.

Thus, in the first mesh M1 in this embodiment, the grating density is increased in the central portion thereof.

Therefore, by disposing the after-mentioned object model in the central portion of the first mesh M1, it becomes possible to more accurately analyze the flow of the fluid around the object.

[Process (b) (S2 in FIG. 2)]

In a process (b), a second mesh is defined in the computer system 1.

Figure 4:
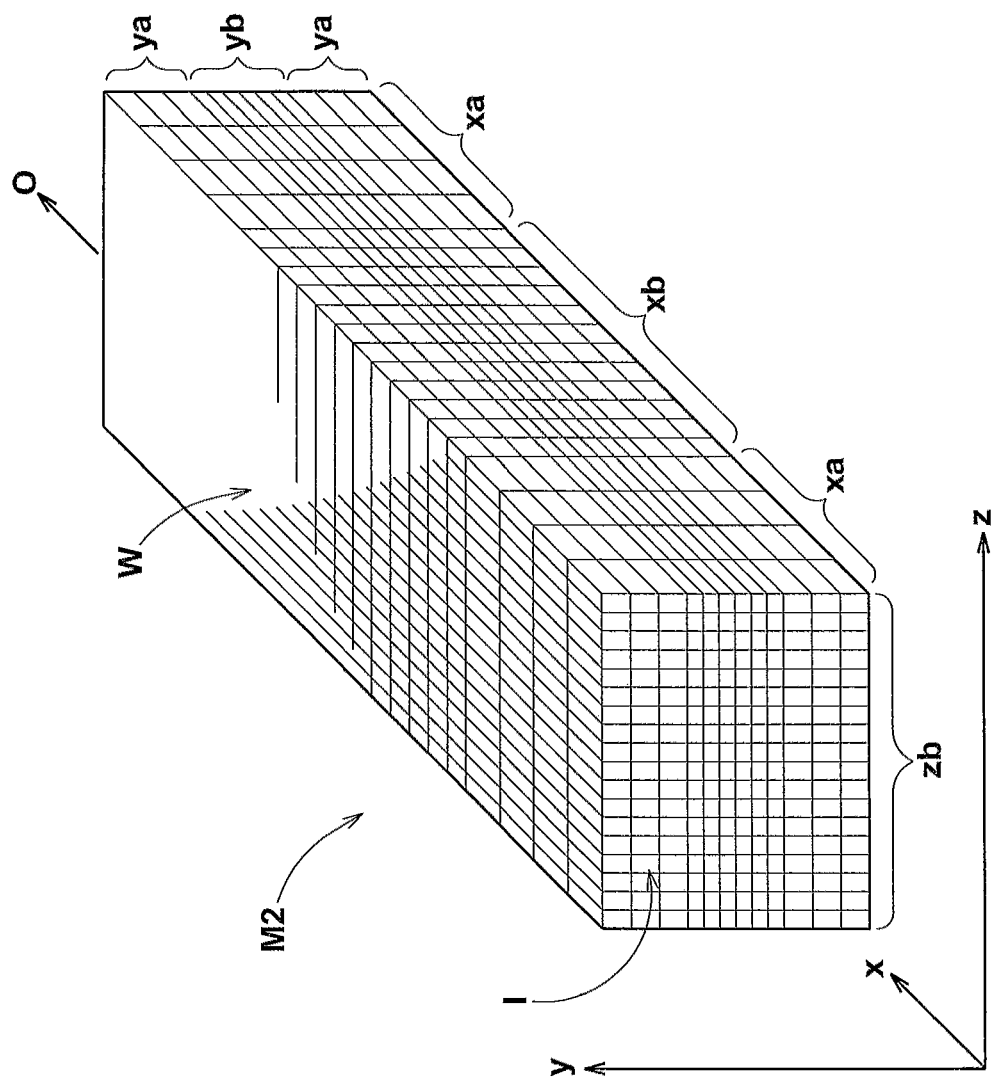
FIG. 4 is a diagrammatic perspective view of a second mesh.

The second mesh M2 is schematically shown in FIG. 4.

The second mesh M2 determines the flow domain namely the 3-D space where the fluid flows, and the flow domain is split into a large number of subdomains (cells).

Therefore, entered in the computer system 1 are parameters which can specify the flow domain and the grid splitting (in this embodiment, the x-, y- and Z-dimensions of the second mesh M2 and the coordinate values of the respective grid points).

The second mesh M2 defines the same 3-D space (outline shape) as that of the first mesh M1.

In the second mesh M2, with respect to two of the three degrees of freedom of the first mesh M1, the 3-D space is non-uniformly split in the same manner as the first mesh. But, with respect to the remaining one of the three degrees of freedom, the space is uniformly split.

More specifically, in this embodiment, with respect to the x-axis direction and y-axis direction, the second mesh M2 is non-uniformly split in the same manner as the first mesh.

But, with respect to the z-axis direction, the second mesh M2 is uniformly split at equal intervals same as those in the finely-split domain zb.

Accordingly, the number of cells of the second mesh M2 becomes larger than the number of cells of the first mesh M1.

[Process (c) (S3 and S4 in FIG. 2)]

In a process (c), an object model of the object is defined in the computer system 1.

Figure 5:
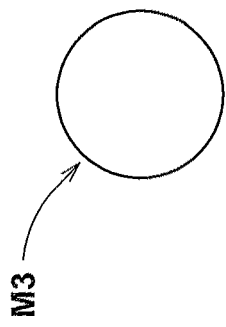
FIG. 5 is a diagram showing an object model.

The object model M3 is schematically shown in FIG. 5.

The object model M3 in this embodiment has a spherical form proximate to the golf ball.

If the influence of dimples on the airflow is to be examined, the surface of the object model M3 is provided with irregularity (not shown) corresponding to dimples.

Figure 6:
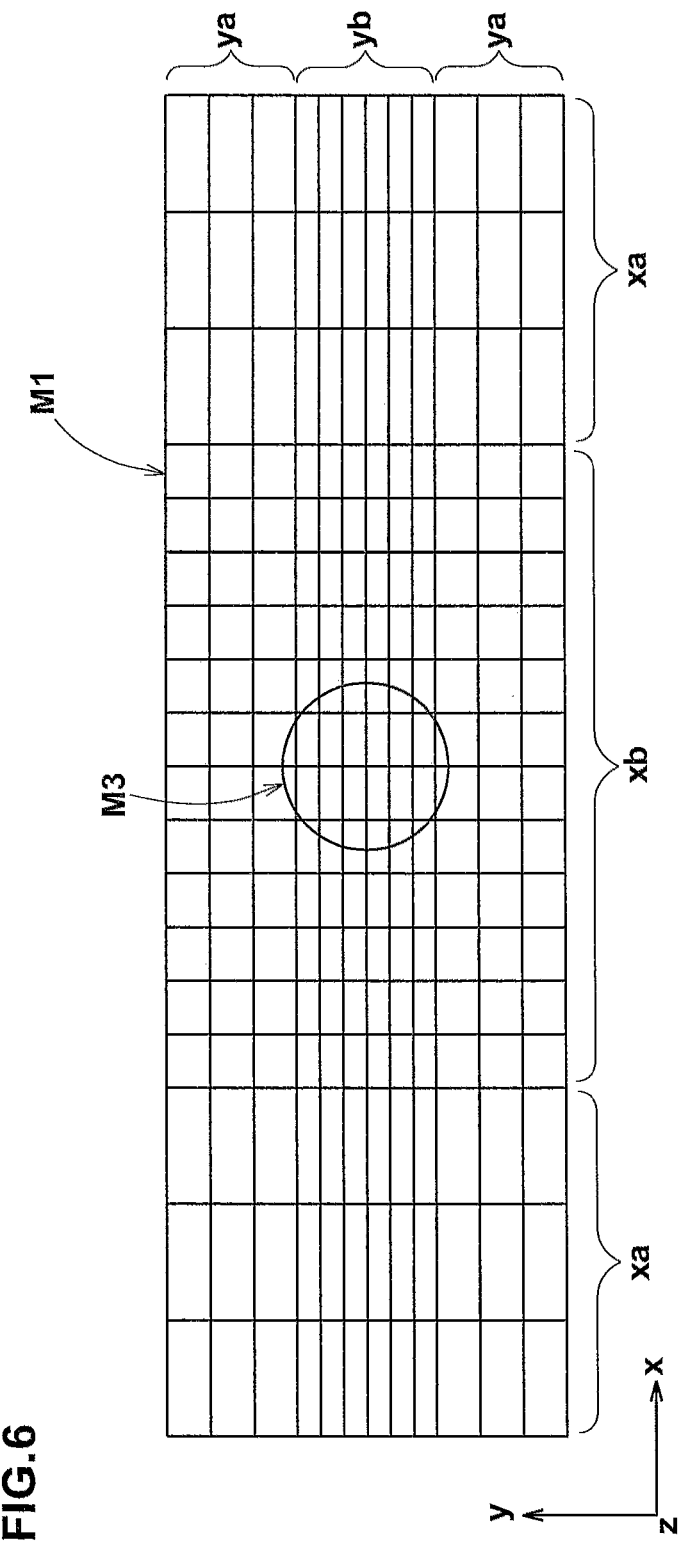
FIG. 6 is a diagrammatic side view showing a state in which the object model is set in the first mesh.

In the process (c), as visualized in FIG. 6, the object model M3 is set in the first mesh M1, and a relative positional relationship therebetween is specified.

Namely, when carrying out the simulation, the relative positional relationship is defined so that the object model M3 is positioned within the first mesh M1. In this embodiment, the center of the first mesh M1 is positioned at the same position as the center of the object model M3.

Next (S5 in FIG. 2), predetermined computational conditions are given.

The computational conditions include a time step $\Delta t$ to make the simulation calculation, the density of the fluid, and boundary conditions at boundary surfaces of the cells.

[Process (d) (S5 in FIGS. 2 and S61-S62 in FIG. 7)]

As to the boundary conditions in this embodiment, the surface of the object model M3 is set as a nonslip wall.

In the first mesh M1, the velocity v of the fluid is defined at the entrance I for the fluid, and the pressure 0 of the fluid is defined at the exit O for the fluid.

And external surfaces W of cells existing between the entrance I and the exit O are provided with conditions of Full Slip Wall.

Further, it is possible to give convergence conditions, number of iterations and the like as the computational conditions when iterative calculation (sub-iterations) is carried out in order to correct the velocity field by the use of a pressure-correction equation.

These conditions are entered in the computer system 1 beforehand, and retrieved during the simulation calculation.

Figure 7:
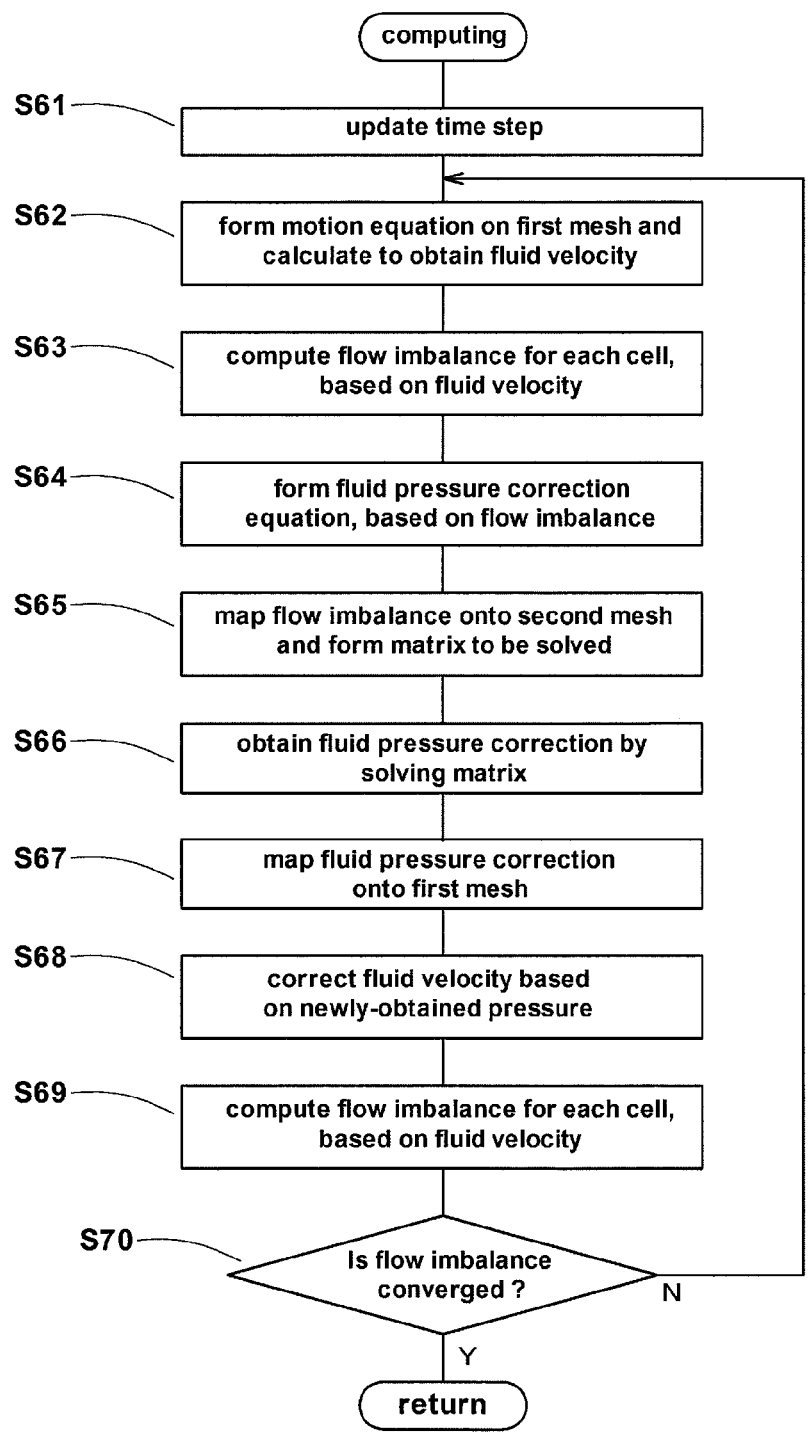
FIG. 7 is a detailed flow chart of the computational process according to an embodiment of the present invention.

As shown in FIG. 7 which shows the detail of the process S6 shown in FIG. 2, in the process (d), the time step of the simulation is updated in the computer system 1 (S61 in FIG. 7).

Then, by the use of the object model M3 and the first mesh M1 for which their relative positional relationship is defined, a motion equation (see the following equation (1)) concerning the fluid is formed, and the velocity of the fluid is computed by calculating the motion equation (S62). Thereby, each velocity of the fluid when the fluid flows within the first mesh M1 under the above-mentioned conditions is computed.

$$\rho \frac{Dv}{Dt} \equiv \rho \left( \frac{\partial v}{\partial t} + [v \cdot \nabla v] \right) = -\nabla p + \mu \nabla^2 v + \rho \cdot g \qquad \text{Equation (1)}$$

wherein
v: velocity vector,
$\rho$: fluid density,
p: fluid pressure,
t: time,
g: gravitational acceleration.

[Process (e) (S63 in FIG. 7)]

In a process (e), based on the velocity of the fluid obtained in the above-mentioned process (d), the flow imbalance in each cell is computed by the computer system 1.

More specially, for each cell, the mass flux is computed, and the difference between the incoming mass flux and the outgoing mass flux per unit time is computed as the flow imbalance $\Delta m'$.

[Process (f) (S64 in FIG. 7)]

In a process (f), based on the flow imbalance $\Delta m'$, the computer system 1 forms a pressure correction equation relating to the fluid.

More specifically, for each cell, the flow imbalance $\Delta m'$ is divided by the volume of the cell to convert into a form discretized by a finite difference method, and the following pressure equation (2) is formed.

$$\nabla(k\nabla p') = k\left(\frac{\partial^2 p'}{\partial x^2} + \frac{\partial^2 p'}{\partial y^2} + \frac{\partial^2 p'}{\partial z^2}\right) + \qquad \text{Equation (2)}$$
$$\frac{\partial k}{\partial x} \cdot \frac{\partial p'}{\partial x} + \frac{\partial k}{\partial y} \cdot \frac{\partial p'}{\partial y} + \frac{\partial k}{\partial z} \cdot \frac{\partial p'}{\partial z}$$
$$= -\Delta m'$$

wherein,
k: invariable based on structured grid,
p': amount of correction for p in equation (1) (Pressure Correction),
$\Delta m'$: flow imbalance

[Process (g) (S65 and S66 in FIG. 7)]

In a process (g), with the computer system 1, the flow imbalance $\Delta m'$ obtained per each cell is mapped onto a corresponding cell of the second mesh M2, and a matrix to be solved is formed to compute the pressure correction of the fluid.

[Mapping]

As explained, the first mesh M1 is non-uniformly split with respect to each of the three axes. On the other hand, the second mesh M2 is non-uniformly split with respect to each of two axes (x-axis and y-axis) in the same manner as the first mesh M1. But, with respect to the remaining one axis (z-axis), the second mesh M2 is uniformly split.

Therefore, in order to use the flow imbalance Δm' obtained at each grid point of the first mesh M1 in the second mesh M2, with respect to the axis in which the second mesh M2 is uniformly split, mapping (interpolating) is needed.

There are various methods for mapping. But, it is preferred to use numerical interpolation methods. In particular, a linear interpolation method (linear interpolation) or a distance weighting method (weighted inverse distance) is preferred.

Figure 8A:
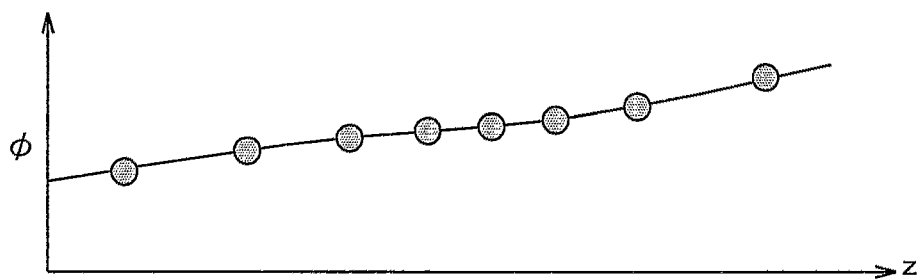
FIG. 8(a) is a graph showing values of a source term in z-axis direction of the first mesh.
Figure 8B:
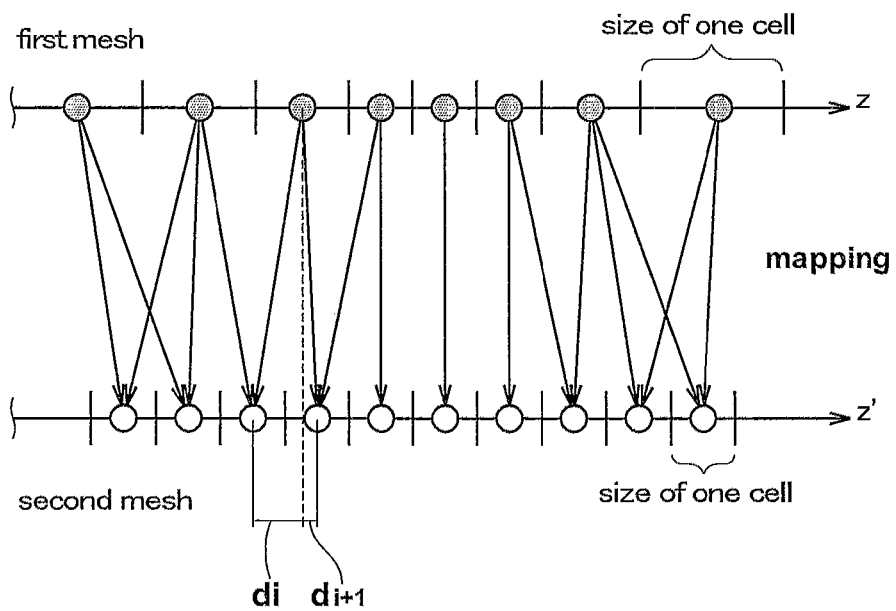
FIG. 8(b) is a diagram for explaining a mapping.

The mapping made by the use of a linear interpolation method is effective when the second mesh M2 as the mapping-target is more finely split than the first mesh M1 as the mapping-source as shown in FIG. 8(b).

As shown in FIG. 8(a), according to the linear interpolation method, the interpolation is made on the assumption that, in one degree of freedom (in this embodiment z-axis) in the mapping-source first mesh M1, the change occurs linearly between two adjacent values of the source term ϕ (Δm') in the first mesh M1. And the interpolated values are assigned to the grid points of the mapping-target second mesh M2 in the same one degree of freedom (in this embodiment Z'-axis).

Figure 8C:
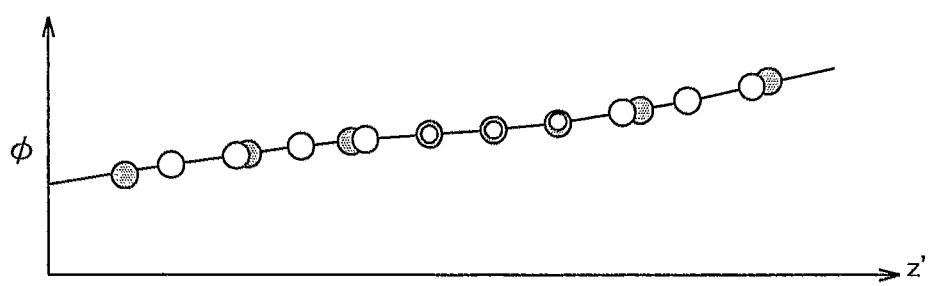
FIG. 8(c) is a graph showing values of the source term mapped onto the second mesh.

FIG. 8(c) shows the source term (interpolated values of flow imbalance Δm') of the second mesh M2 (white circles) which are overlapped with the source term of the first mesh M1 (gray circles).

Figure 9A:
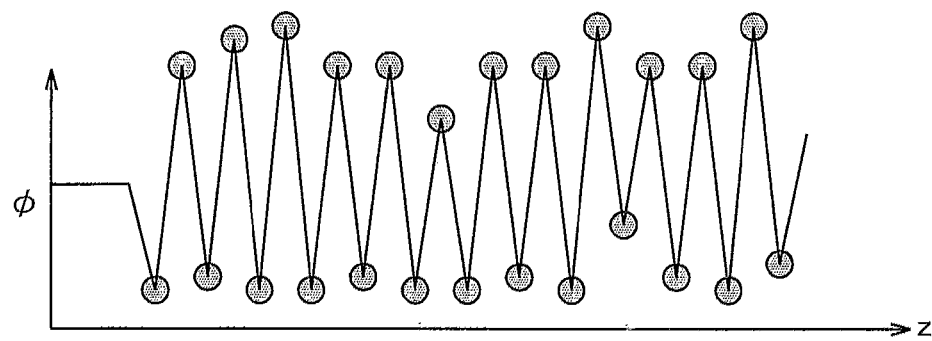
FIG. 9(a) is a graph showing another set of values of the source term in z-axis direction of the first mesh.
Figure 9B:
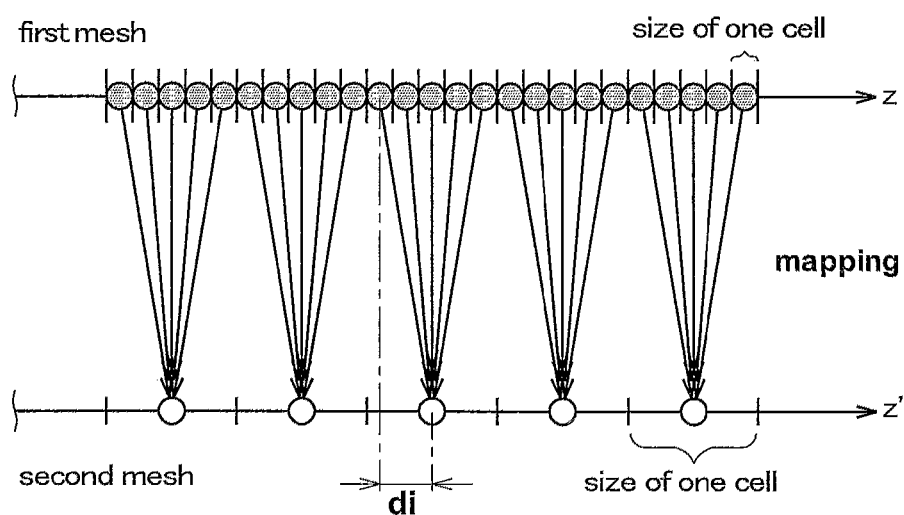
FIG. 9(b) is a diagram for explaining a mapping.

The mapping made by the use of a distance weighting method is effective when the second mesh M2 as the mapping-target is more roughly split than the first mesh M1 as the mapping-source as shown in FIG. 9(b), and further the change in the values of the source term of the first mesh M1 is not smooth and fluctuates at short cycles as shown in FIG. 9(a).

In the inverse distance weighting method, the interpolation is made by the use of all relevant information weighted by an inverse distance from the point in the first mesh M1 to a point on the second mesh M2. Here, the weight decreases as the distance increase from the point on the second mesh M2.

The interpolated value can be obtained by the following equation for example.

$$\phi z' = \Sigma(\omega i \cdot \phi z)(i=1 \sim N)$$

$$\omega i = [(1/di)/\Sigma(1/di)]$$

wherein di is a distance between z and z'

Thus, the distance weighting method has a characteristic such that when di=0, then the value as it is mapped, and other values are almost disregard.

Figure 9C:
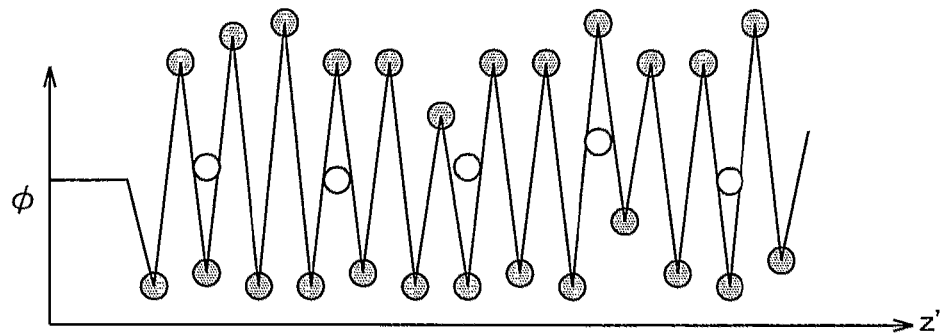
FIG. 9(c) is a graph showing values of the source term mapped onto the second mesh.

FIG. 9(c) shows the source term (interpolated values of flow imbalance Δm') of the second mesh M2 (white circles) which are overlapped with the source term of the first mesh M1 (gray circles).

[Matrix to be Solved]

With the computer system 1, when the flow imbalance Δm' (interpolated value) is mapped onto each cell of the second mesh M2, a matrix to be solved on the second mesh M2 is formed.

For example, the matrix is formed as the following equation (3).

$$\begin{bmatrix} T_1 & b_1 & 0 & 0 \\ a_2 & T_2 & b_2 & 0 \\ 0 & \ldots & \ldots & \ldots \\ 0 & 0 & a_n & T_n \end{bmatrix} \begin{bmatrix} \Phi_1 \\ \Phi_2 \\ \ldots \\ \Phi_n \end{bmatrix} = \begin{bmatrix} r_1 \\ r_2 \\ \ldots \\ r_n \end{bmatrix} \quad \text{Equation (3)}$$

wherein, $T_i$ (i=1 to n): matrix of each slice, $a_i$ and $b_i$ (i=1 to n): coupling terms, $\Phi_i$ (i=1 to n): p' as solution to be obtained $r_i$ (i=1 to n): −Δm' n: grid split number in FIG. 4 in z-axis direction

The above-mentioned slice means one of domains obtained by dividing a computational domain by the number of parallel computations. (The equation (3) is to be solved on the entire computational domain. On the other hand, the after-mentioned equation (5) is to be solved on each of the divided domains.)

[Computation of Fluid Pressure (S66 in FIG. 7)]

In the computation of the pressure of the fluid on the second mesh M2, with the computer system 1, the above-mentioned matrix is Fourier transformed into a collection of a plurality of diagonal matrixes. See equation (4)

As apparent from the comparison between the equation (4) and equation (3), in the equation (4), the coupling terms $a_i$ and $b_i$ existing in the equation (3) are removed by the Fourier transformation. As a result, in the equation (4), it becomes possible to compute each slice without reference to other slices. Thus, using a direct method such as a block cyclic reduction method, the computer system 1 can calculate each split-off determinant of matrix. See equation (5)

Then, with the computer system 1, the obtained solution Φ is inverse Fourier transformed into the former unknown quantity, pressure p'.

$$\begin{bmatrix} \tilde{T}_1 \tilde{\Phi}'_1 = \tilde{r}_1 \\ \tilde{T}_2 \tilde{\Phi}'_2 = \tilde{r}_2 \\ \ldots \\ \tilde{T}_n \tilde{\Phi}'_n = \tilde{r}_n \end{bmatrix} \quad \text{Equation (4)}$$

$$\tilde{T}_l \tilde{\Phi}'_l = \tilde{r}_l \quad \text{Equation (5)}$$

wherein $\tilde{T}_i$ (i=1~n): matrix of each slice, $\tilde{\Phi}_i$ (i=1~n): Fourier Transform of the p' as solution to be obtained $\tilde{r}_i$ (i=1~n): Fourier Transform of the −Δm' n: grid split number in FIG. 4 in z-axis direction

[Process (h) (S67, S68, S69 in FIG. 7)]

In the process (h), with the computer system 1, the pressure correction p' obtained on the second mesh M2 by the process (g) is mapped onto the first mesh M1.

For the mapping, the above-explained method is preferably employed in this process too.

By the mapping, the fluid pressure on the first mesh ml is updated by the pressure correction p' (revised value of p) computed by the use of the pressure correction of the second mesh M2, and the flow imbalance is computed for each cell, based on fluid velocity.

[Loop Process]

The above-mentioned processes (d)-(h) are repeated by the computer system 1 until the flow imbalance Δm' obtained in the process (e) or S63 is converged so that the velocity obtained also satisfy the motion equations.

More specifically, if the computer system 1 makes such a judgment that the flow imbalance Δm' satisfies the predetermined convergence condition (for example, its difference from the previous calculation value is below a threshold) (Y in S70), then this loop process ends and returns to the main process. (S7 in FIG. 2)

If the computer system 1 makes such a judgment that the flow imbalance Δm' does not satisfy the predetermined convergence condition (for example, its difference from the previous calculation value is over a threshold) (N in S70), then the computer system 1 executes the processes S62 to S69 once again.

Thus, the loop process is repeated until the convergence condition is satisfied.

The convergence condition in this loop process can be set arbitrarily. Aside from the threshold, for example, it is possible to set the upper limit of the repeat count of the loop.

[Passage of Time (Over Time) Control Process]

The computer system 1 judges if the process exceeds a predetermined time period or a predetermined number of computational processes.

If false or not exceeds (N in S7), then the processes shown in FIG. 7 are executed once again.

If true or exceeds (Y in S7), then this process ends and goes to the next process. (S8 in FIG. 2)

[Process (i) (S8 in FIG. 2)]

Figure 16:
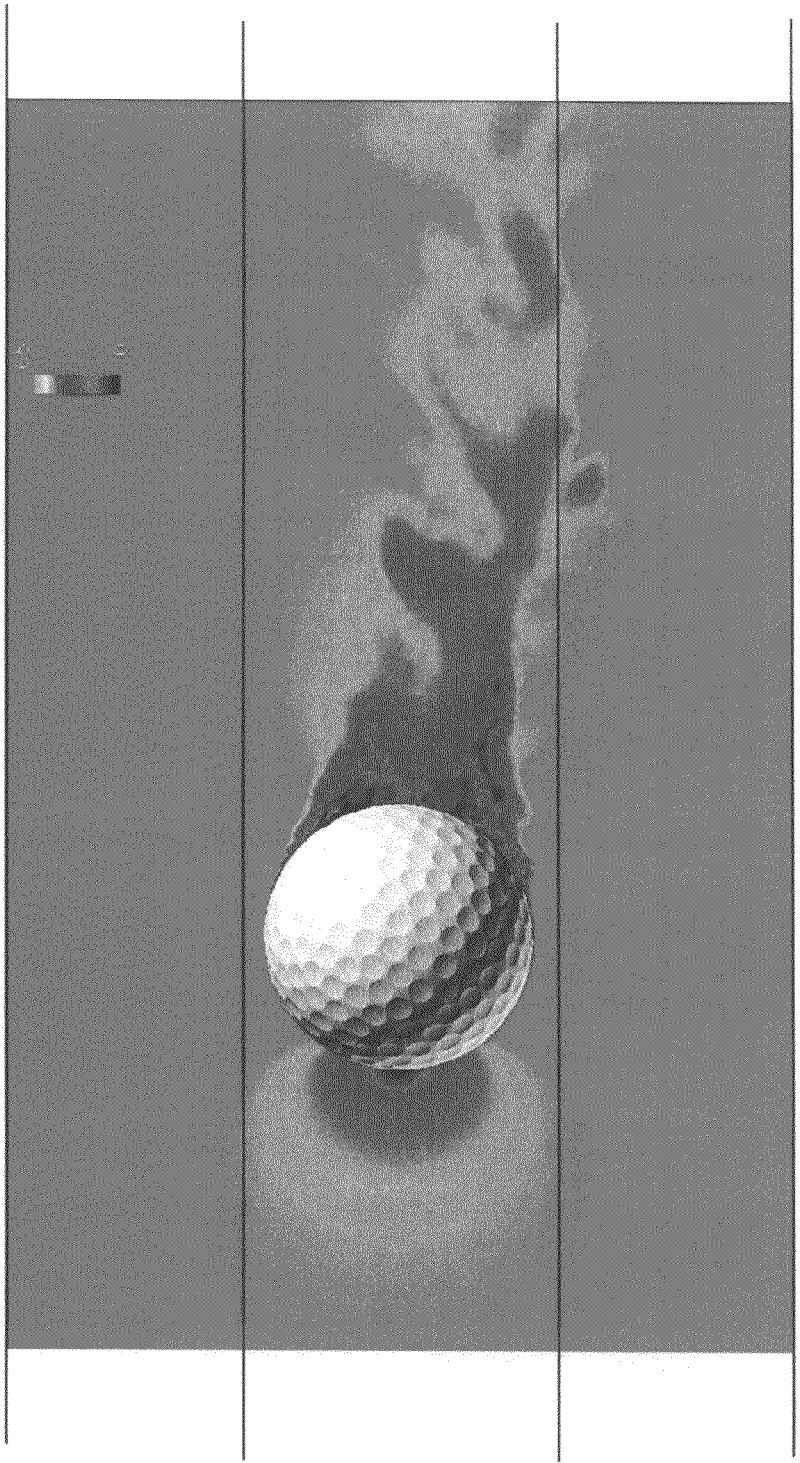
FIG. 16 shows the magnitude of fluid velocity around a golf ball obtained by the simulation method according to the present invention.

In the process (i), the computer system 1 outputs the obtained simulation results by the use of the display 1d and/or a printer, for example as shown in FIG. 16 in which the magnitude of fluid velocity around a golf ball is visualized using a change in color. It is of course possible to output the simulation results in various ways, for example, moving image, listing of numeric data, and the like aside from a still image.

Comparison Tests

Using the first mesh and second mesh shown in FIG. 3 and FIG. 4, an aerodynamic simulation of a golf ball was made.

Figure 10:
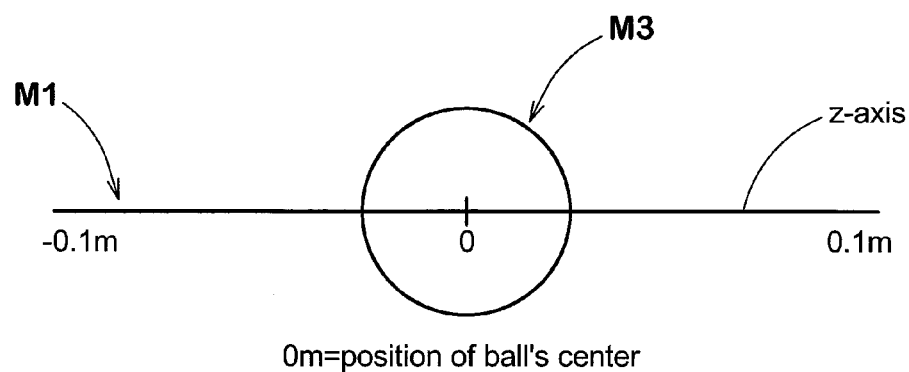
FIG. 10 shows a positional relationship between the object model and the z-axis of the first mesh in this embodiment.

FIG. 10 shows the positional relationship between the object model M3 and the z-axis of the first mesh.

The width of the first mesh in the Z-direction was 0.2 m.

The diameter of the object model M3 was 42.7 mm.

The object model M3 was set in the center portion of the first mesh in the z-axis direction.

Figure 11:
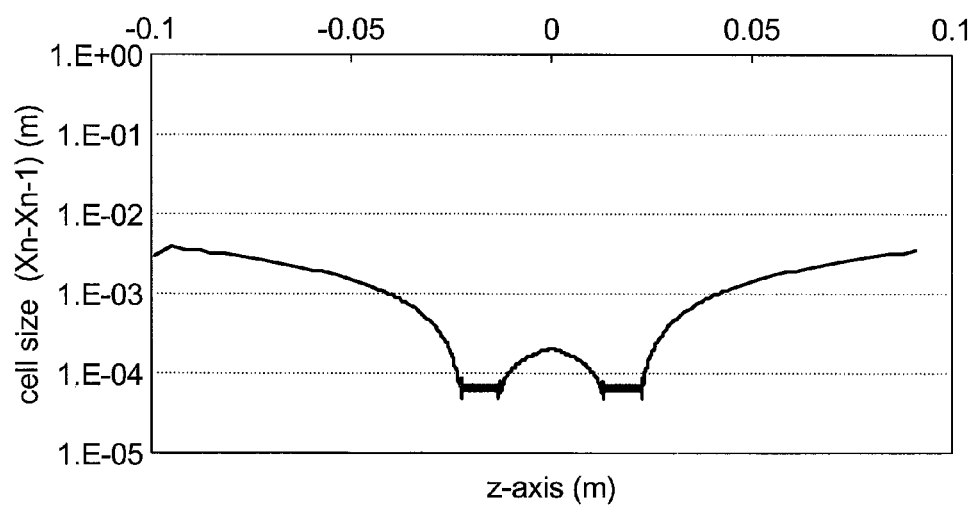
FIG. 11 is a graph showing a change in the grid (cell) size of the first mesh in the z-axis direction in this embodiment.

FIG. 11 shows a variation in the grid size (cell size) of the first mesh wherein the axis of abscissas corresponds to the z-axis of the first mesh, and the axis of ordinate corresponds to the grid size.

As shown, the grid size was minimum in the vicinity of the object model M3, and the grid size was gradually increased therefrom toward both sides in the z-axis direction.

The number of the grid points provided in the flow domain between +0.1 m and −0.1 m in the z-axis direction was 1024.

Using the mesh M1 and object model M3, the following Poisson equation (6) was calculated.

$$\nabla^2 \phi = r \qquad \text{Equation (6)}$$

Figure 12:
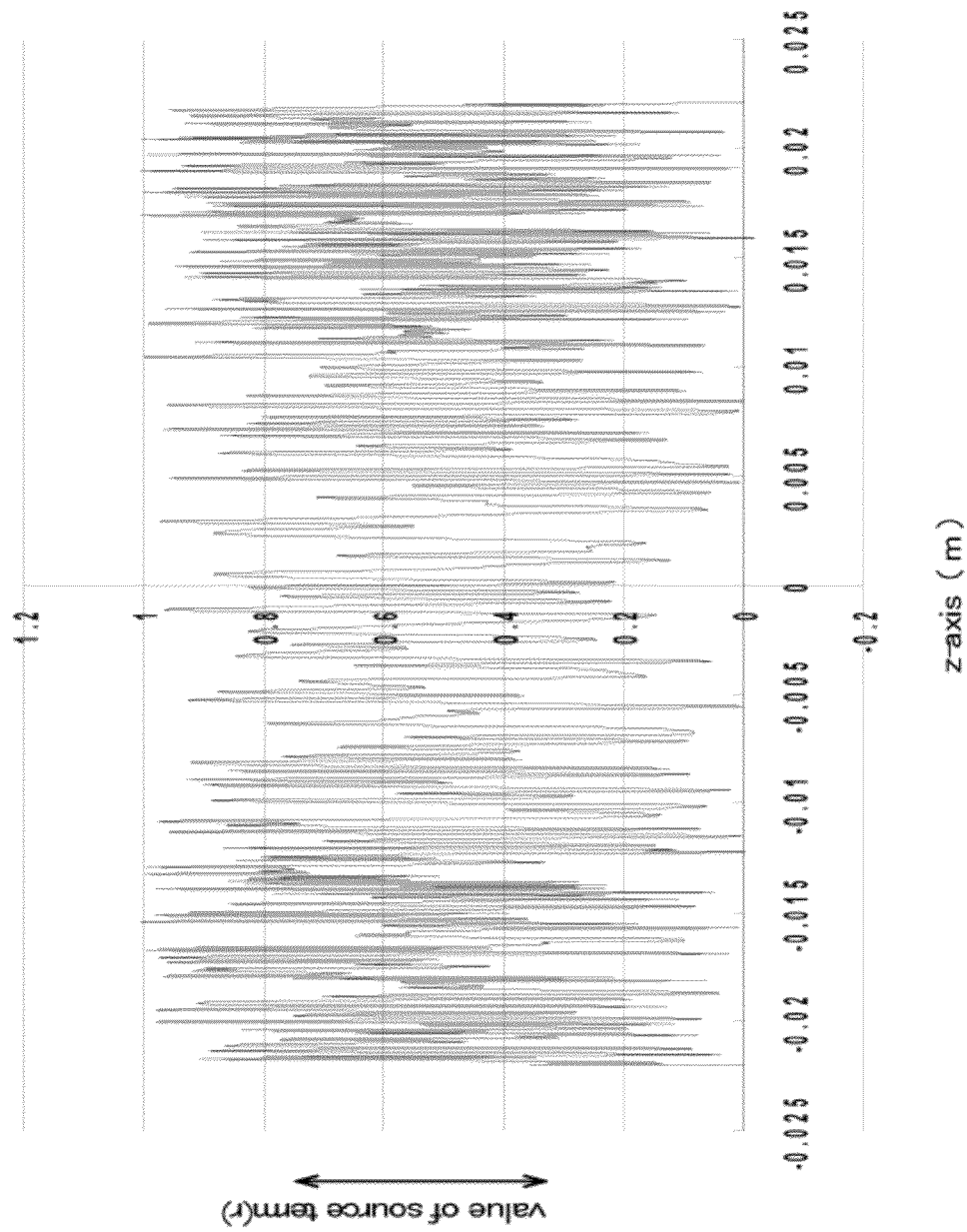
FIG. 12 is a graph showing values of a source term in the z-axis direction of the first mesh in a working example according to the present invention.

Here, the source term (r) had values shown in FIG. 12.

These values were randomly generated around the golf ball (object model M3).

Next, the second mesh was set up. In the domain of the second mesh between +0.1 m and −0.1 m in the z-axis direction, 700 grid points were provided at even intervals. Accordingly, the grid spacing was about 0.000286 m (=(0.1 m−(−0.1 m))/700).

Figure 13:
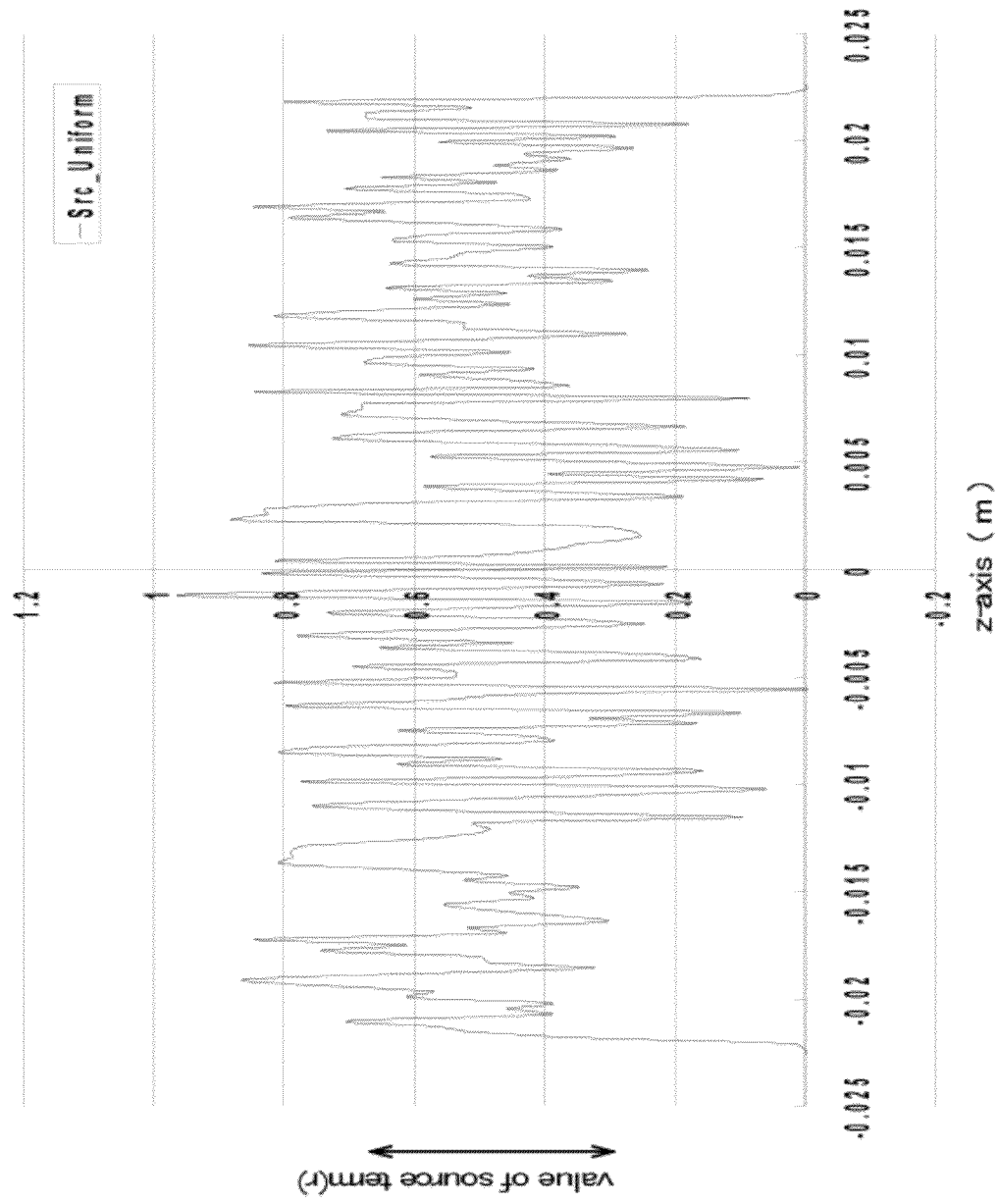
FIG. 13 is a graph showing values of the source term mapped onto the second mesh in the working example.

In this example, using a inverse distance weighting method, the mapping was made from the first mesh to the second mesh. The result is shown in FIG. 13.

On the second mesh which was uniformly split in the z-axis direction, the pressure correction equation (Poisson equation) was calculated, and the solution obtained was mapped onto and put back to the first mesh.

In the calculation of the pressure correction equation, after the number of dimensions was reduced by using FFT as explained above, the calculation was made by the use of a block cyclic reduction method.

In order to put the solution back to the first mesh, the mapping was made by the use of a distance weighting method.

Figure 14:
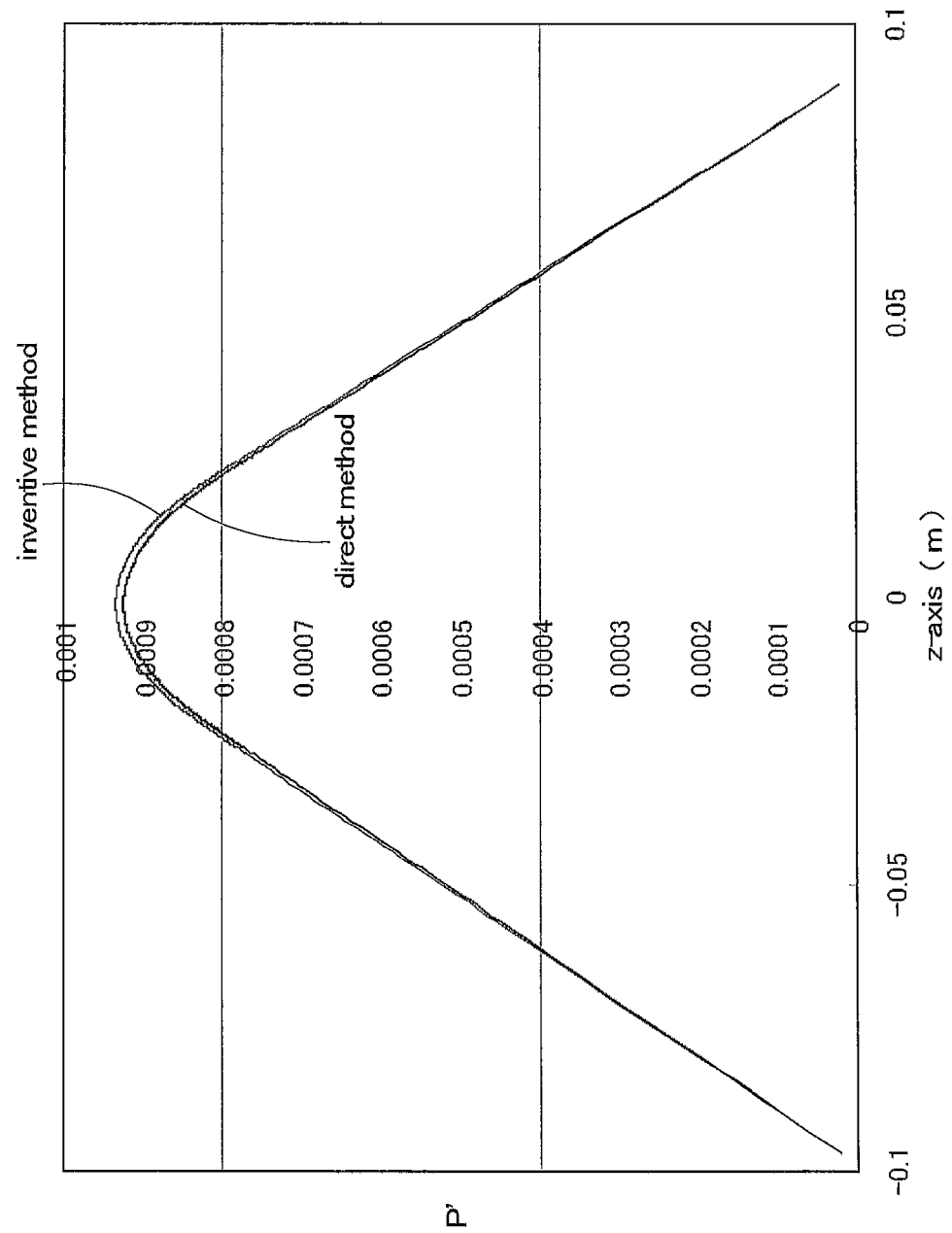
FIG. 14 is a graph showing solutions computed by a method according to the present invention and a direct method.

FIG. 14 shows the solution computed by the method according to the present invention (hereinafter the inventive method) and the solution computed by the use of the first mesh only without mapping namely by a direct method (hereinafter the direct method).

As shown, the result computed according to the present invention substantially coincides with the result computed according to the conventional direct method.

Next, the influence of the grating density of the second mesh on the simulation accuracy is explained.

In this example, the grid size (grid spacing) (unit: m) is given by the following equation $$\text{grid size} = 0.2/N$$

wherein

N is the number of the cells.

Figure 15:
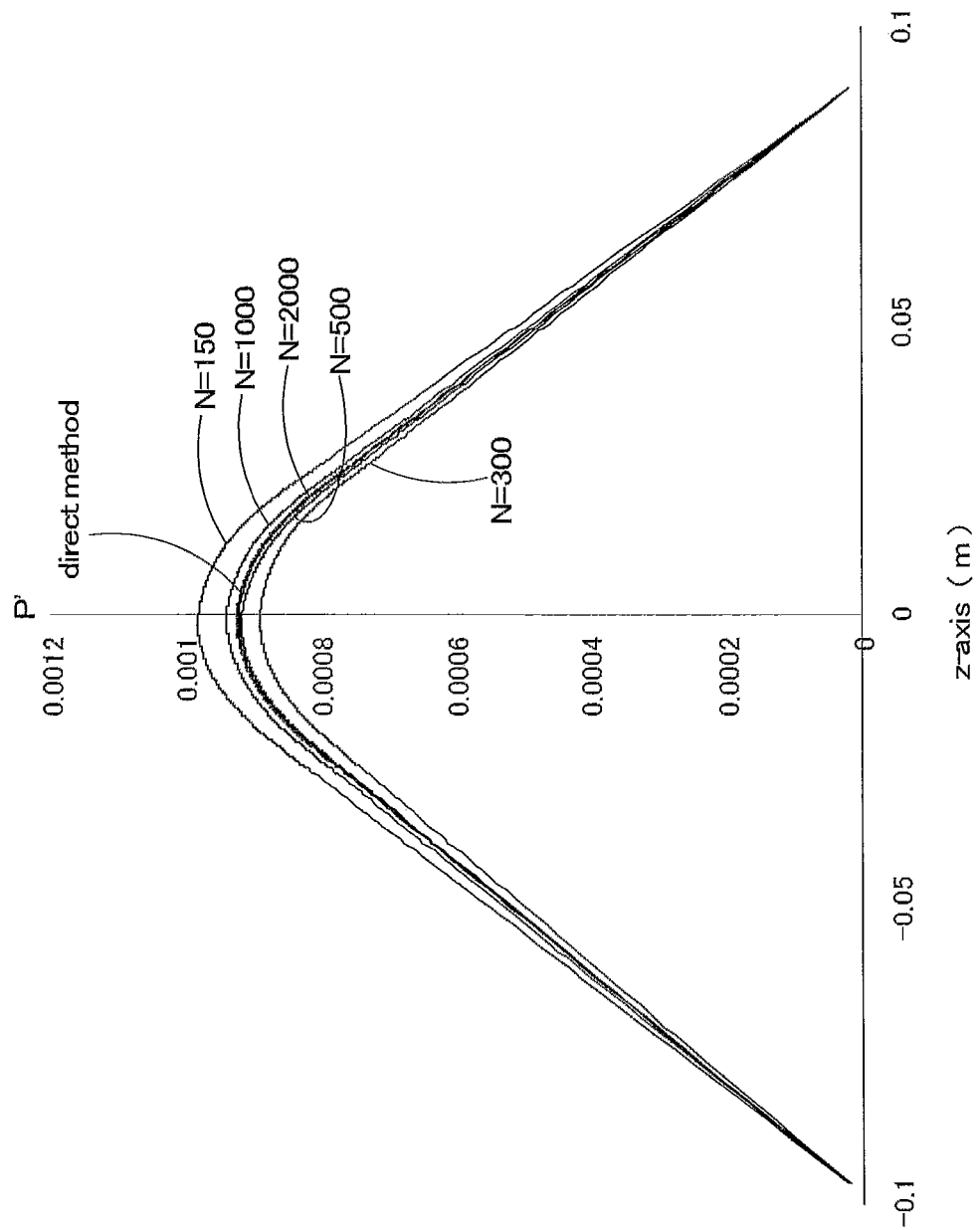
FIG. 15 is a graph showing an influence of the grating density of the second mesh on the simulation accuracy.

By changing the number N (N=150, 300, 500, 1000, 2000), it was checked how the accuracy was changed. The results are shown in FIG. 15.

As shown, as the grating density of the background mesh becomes higher (grid spacing becomes smaller), the result becomes closer to that of the direct method and the accuracy of the solution becomes increased.

In FIG. 16, the magnitude of the flow velocity of the fluid obtained from the results of the above-mentioned simulation is visualized using a change in color.

As explained above, the method according to the present invention can be expected to improve the computational efficiency. For example, in the event that cells have to be arranged in the z-axis direction at equal intervals, when a golf ball having a diameter of 0.0427 m is disposed at the center in the z-axis direction, in order to maintain the analytical accuracy, the grid spacing has to be about 7.50E-5(m) according to the experimental rules.

If the analytic domain extends from −0.25 m to +0.25 m, the split number in the Z-direction reaches to 6670.

In the x- and y-axis directions, however, it is usually enough for the accuracy that the split number is about 1000 because cells can be arranged with unequal splitting. For example, the total number of the cells in such mesh reaches to about seven thousand million. (6670×1024×1023=6987171840)

Thus, according to the conventional method in which a motion equation has to be solved with respect to each of the seven thousand million cells, a huge amount of memory is required for the computer system, and the computational time becomes very long.

In the present invention, however, since the cells in the first mesh can be arranged at unequal intervals in the Z-direction in addition to x- and y-directions such that unnecessary analysis domains are roughly split, the split number in the Z-direction can be reduced to about 1000.

The total number of the cells of such mesh is about one thousand million. (1000×1024×1023=1047552000)

Thus, the computational scale can be reduced to about 1/7.

It is further understood by those skilled in the art that the foregoing description is a preferred embodiment of the disclosed simulation method and that various changes and modifications may be made in the invention without departing from the spirit and scope thereof. For example, it is not necessary to execute the processes S1-S5 in FIG. 2, in particular S1, S2 and S3, in this order.

The invention claimed is:

1. A three-dimensional fluid simulation method for analyzing a flow of fluid around an object by the use of a computer comprising:
    a process (a) in which a first mesh of the entirety of a three-dimensional space where the fluid flows, is defined in the computer, wherein the first mesh is defined by non-uniformly splitting the three-dimensional space with respect to each of three degrees of freedom of the three-dimensional space;
    a process (b) in which a second mesh of the entirety of the three-dimensional space is defined in the computer, wherein the second mesh is defined by non-uniformly splitting the three-dimensional space with respect to two of the three degrees of freedom in the same manner as the first mesh and uniformly splitting the three-dimensional space with respect to the remaining one of the three degrees of freedom;
    a process (c) in which an object model of the object is defined in the computer, wherein the object model is defined by splitting the object into a finite number of cells, and the object model is disposed in the first mesh;
    a process (d) in which boundary conditions are given and a motion equation relating to the fluid around the object model in the first mesh, is defined, and velocity of the fluid is computed from the motion equation;
    a process (e) in which a flow imbalance is computed for each cell in the first mesh based on the obtained velocity of the fluid;
    a process (f) in which a pressure correction equation relating to the fluid is defined based on the obtained flow imbalance in the first mesh;
    a process (g) in which the obtained flow imbalance in the first mesh is mapped onto the second mesh without the object, and the pressure correction of the fluid is computed on the second mesh; and
    a process (h) in which the obtained pressure correction is mapped onto the first mesh with the object, and the fluid pressure on the first mesh is updated based on the mapped pressure correction, and the velocity of the fluid is obtained based on the updated fluid pressure,
    wherein the processes (d)-(h) are repeated until the flow imbalance is converged.

2. The three-dimensional fluid simulation method according to claim 1, wherein
    the mapping in the process (g) is made by the use of a numerical interpolation method.

3. The three-dimensional fluid simulation method according to claim 1 or 2, wherein
    each of the first mesh and the second mesh is an orthogonal mesh.

4. The three-dimensional fluid simulation method according to claim 1, wherein
    the object is spherical, and the fluid is air.

5. The three-dimensional fluid simulation method according to claim 1, wherein
    the mapping in the process (h) is made by the use of a numerical interpolation method.

6. The three-dimensional fluid simulation method according to claim 1, wherein
    each of the first mesh and the second mesh is an orthogonal mesh in a x-y-z coordinate system, and
    in the second mesh, the non-uniform splitting is made in the x-axis direction and y-axis direction and the uniform splitting is made in the z-axis direction.

* * * * *